Edward F. Ring.
Rotary Stirrer and Cooler.

109548  PATENTED NOV 22 1870

Witnesses.

Edw. F. Ring, Inventor.
by
his Attorneys.

United States Patent Office.

EDWARD F. RING, OF ST. LOUIS, MISSOURI.

Letters Patent No. 109,548, dated November 22, 1870.

IMPROVEMENT IN APPARATUS FOR STIRRING AND COOLING LARD.

The Schedule referred to in these Letters Patent and making part of the same.

*To all whom it may concern:*

Be it known that I, EDWARD F. RING, of St. Louis, in the county of St. Louis and State of Missouri, have invented a new and improved Rotary Stirrer and Cooler; and I do hereby declare the following to be a full, clear, and exact description of the same, reference being had to the accompanying drawing making part of this specification, in which—

Figure 1:
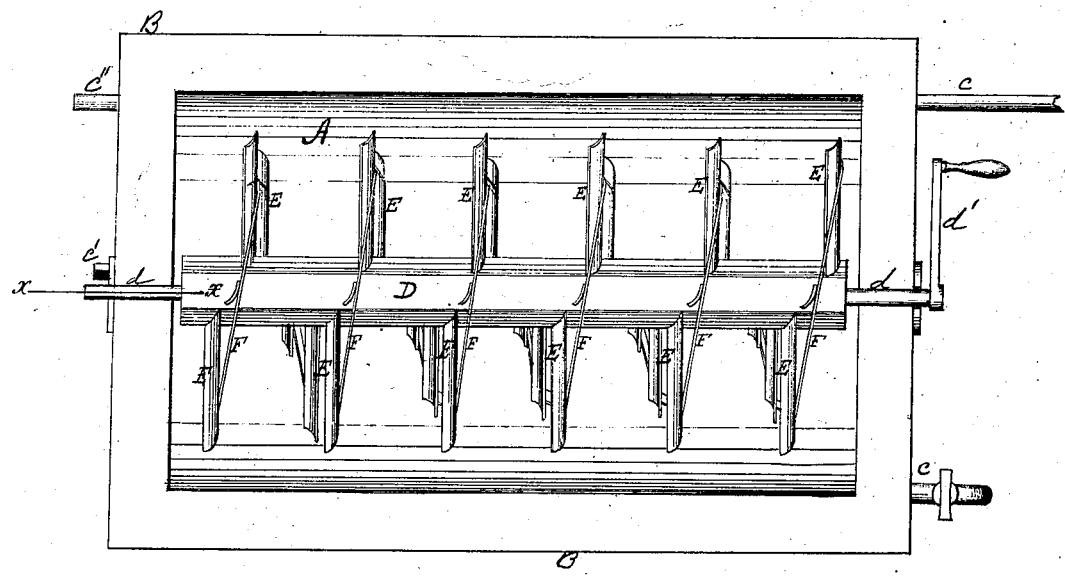
Figure 1 is a top view.
Figure 2:
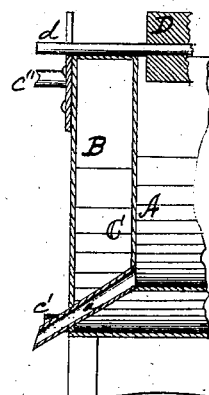
Figure 2 represents a portion of the apparatus with the wall broken away at $x\ x$.

The object of this invention is to provide for public use a machine by which lard, oils, or other substance of similar character may be cooled rapidly and uniformly. To this end The invention consists in a stirring apparatus of peculiar construction, and in the combination thereof with a jacketed vessel, having suitable inlets and outlets to the space between its double walls, as hereinafter more particularly described.

In the drawing—

A is the inner and B the outer wall of the vessel, in which the lard, oil, or other substance is placed, C designating the space between the walls.

$c\ c$, inlets thereto, by which said space may be filled with steam, cold water, &c.;

$c^1$, an outlet, by which the condensed steam, water, &c., may be drawn off;

$c^2$, an overflow or waste-pipe; and $a$, a pipe, through which the liquid contents of the vessel A may escape or be removed, when necessary.

D is a shaft, bearing at $d\ d$, and capable of being rotated by means of a crank, $d'$, or pulley.

Arranged spirally on this shaft are a series of projecting blades, E E, which, as the shaft is rotated, pass through the lard, keeping it in agitation so as to mix it thoroughly while constantly exposing a new surface, whereby it is rapidly cooled. At the same time their spiral arrangement has the effect to move the body of the lard toward the lower or outlet end of the vessel.

Figure 3:
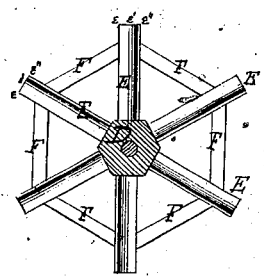
Figure 3 is a cross-section of the stirrer-shaft.

Each blade E is of peculiar form, being designed to enter the lard and leave it without splashing the liquid, and to push the mass along toward the outlet. This result is accomplished by making the blades wide and thin, with sharp edges, and so bent that their cross-section, as seen in fig. 3, shows a straight line from $e$ to $e'$, and a curve or oblique line from $e'$ to $e''$.

Thus constructed they are arranged on the shaft in such a position that the straight portion of the blade $e\ e'$ cuts directly into the fluid, disturbing the latter but slightly, and causing no splashing whatever. The oblique part $e'\ e'$ follows, agitating the lard and pushing it along in the vessel, as above referred to.

F F are braces connecting the blades, and serving also, by their spiral position, to agitate the fluid and impel it along. They form, it will be observed, a continuous line, so that no splashing is caused thereby.

When it is desired to melt lard or other similar substance, the space C may be filled with hot steam.

When the vessel is employed as a cooler, cold water may be used instead of steam. Suitable cocks may, of course, be attached to the outlet and inlet pipes wherever desired.

I disclaim a revolving shaft provided with continuous spiral flange, and used in connection with a jacketed vessel for this same purpose, knowing this to be old; but having thus described my invention,

What I claim as new, and desire to secure by Letters Patent, is—

1. The blades E E, when constructed in the curved form shown at $e\ e^1\ e^2$, and arranged in an inclined position spirally around the shaft D, substantially as and for the purpose specified.

2. The combination of the shaft D, provided with inclined blades E E, constructed, as above described, with the jacketed vessel A, substantially as and for the purpose set forth.

ED. F. RING.

Witnesses:
 THOS. D. D. OURAND,
 CHAS. A. PETTIT.